(12) United States Patent
Endo et al.

(10) Patent No.: US 11,484,143 B2
(45) Date of Patent: Nov. 1, 2022

(54) MOVABLE BODY AND METHOD OF USING THE SAME

(71) Applicant: TOYOTA JIDOSHA KABUSHIKI KAISHA, Toyota (JP)

(72) Inventors: Masato Endo, Chofu (JP); Katsuhiko Yourou, Toyota (JP); Shunji Tateishi, Kasugai (JP); Nobukatsu Fujishita, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 225 days.

(21) Appl. No.: 16/787,505

(22) Filed: Feb. 11, 2020

(65) Prior Publication Data

US 2020/0281385 A1 Sep. 10, 2020

(30) Foreign Application Priority Data

Mar. 4, 2019 (JP) .............................. JP2019-038830

(51) Int. Cl.
*A47G 29/14* (2006.01)
*B25J 5/00* (2006.01)
*B25J 9/00* (2006.01)
*G06Q 10/08* (2012.01)

(52) U.S. Cl.
CPC ............ *A47G 29/141* (2013.01); *B25J 5/007* (2013.01); *B25J 9/0003* (2013.01); *G06Q 10/083* (2013.01); *G06Q 10/0836* (2013.01); *A47G 2029/142* (2013.01); *A47G 2029/145* (2013.01)

(58) Field of Classification Search
CPC ............ A47G 29/141; A47G 2029/142; A47G 2029/145; A47G 2029/149; B25J 5/007; B25J 9/0003; B25J 11/008; G06Q 10/083; G06Q 10/0836; B62D 63/02; B62D 63/04
USPC .............................. 232/1 R, 19, 45; 705/330
See application file for complete search history.

(56) References Cited

U.S. PATENT DOCUMENTS

| | | | |
|---|---|---|---|
| 10,459,450 B2* | 10/2019 | Sibley | B25J 9/1694 |
| 10,514,690 B1* | 12/2019 | Siegel | G01C 23/00 |
| 10,538,190 B1* | 1/2020 | Metellus | G08G 9/00 |
| 11,099,562 B1* | 8/2021 | Ebrahimi Afrouzi | G05D 1/0088 |
| 11,164,273 B2* | 11/2021 | Heinla | G05D 1/0282 |
| 2015/0006005 A1* | 1/2015 | Yu | G06Q 50/28 701/22 |
| 2016/0104099 A1* | 4/2016 | Villamar | G06Q 50/28 705/26.81 |
| 2017/0008580 A1* | 1/2017 | Meager | B60K 1/04 |
| 2018/0005169 A1* | 1/2018 | High | G06Q 10/06315 |
| 2018/0024554 A1* | 1/2018 | Brady | G06Q 10/0837 701/23 |

(Continued)

FOREIGN PATENT DOCUMENTS

| | | |
|---|---|---|
| JP | 11-172938 A | 6/1999 |
| JP | 2016-095782 A | 5/2016 |
| JP | 2017-202012 A | 11/2017 |

*Primary Examiner* — William L Miller
(74) *Attorney, Agent, or Firm* — Sughrue Mion, PLLC

(57) ABSTRACT

A movable body is configured to receive a package at a first location and wait for a recipient at a second location that is different from the first location. The movable body includes: a body configured to perform autonomous driving; a storage box attached to the body, the storage box being configured to temporarily store the package; and a controller configured to move the body from the first location to the second location.

1 Claim, 3 Drawing Sheets

(56) References Cited

U.S. PATENT DOCUMENTS

| | | | | |
|---|---|---|---|---|
| 2018/0232839 A1* | 8/2018 | Heinla | ................. | G05D 1/0282 |
| 2018/0330313 A1* | 11/2018 | Clarke | ................... | G06Q 50/28 |
| 2018/0330325 A1* | 11/2018 | Sibley | ................... | B66F 9/0755 |
| 2019/0049988 A1* | 2/2019 | Meij | .................... | G05D 1/0274 |
| 2019/0265717 A1* | 8/2019 | McHale | ............... | A47G 29/141 |
| 2021/0007523 A1* | 1/2021 | Baek | .................... | A47G 29/141 |

* cited by examiner

MOVABLE BODY AND METHOD OF USING THE SAME

CROSS-REFERENCE TO RELATED APPLICATION

This application claims priority to Japanese Patent Application No. 2019-038830 filed on Mar. 4, 2019 incorporated herein by reference in its entirety.

BACKGROUND

1. Technical Field

The present disclosure relates to a movable body, and relates also to a method of using the same.

2. Description of Related Art

Japanese Unexamined Patent Application Publication No. 2016-95782 (JP 2016-95782 A) describes delivery lockers for multi-family residences. A management server manages a plurality of delivery lockers. Over a network, the management server notifies a recipient that a parcel has been placed into a delivery locker or allows a delivery person to check whether there are any compartments available in a delivery locker. Japanese Unexamined Patent Application Publication No. 11-172938 (JP 11-172938 A) describes a coin-operated locker configured such that baggage is placed thereinto and taken out therefrom through automated operation. Baggage is placed in a package port (2a) and then an operation button is operated. Upon the operation of the operation button, the baggage is mechanically moved to a locker storage shelf (2b) automatically.

SUMMARY

However, the delivery lockers described in JP 2016-95782 A are not self-propelled. Once a parcel is placed into the delivery locker, a recipient needs to go to the delivery locker to receive the parcel. With the coin-operated locker described in JP 11-172938 A, baggage can be moved mechanically instead of being moved manually. However, a user needs to operate the coin-operated locker each time the user uses it, the user cannot receive the baggage without illustrating up at the coin-operated locker.

The present disclosure provides a movable body configured to reduce the burdens on a recipient and a delivery person, and also provides a method of using the movable body.

A first aspect of the present disclosure relates to a movable body configured to receive a package at a first location and wait for a recipient at a second location that is different from the first location. The movable body is a delivery support apparatus. The movable body includes: a body configured to perform autonomous driving; a storage box attached to the body and configured to temporarily store the package; and a controller configured to move the body from the first location to the second location.

A second aspect of the present disclosure relates to a method of using a movable body. The method is a method of assisting delivery. The movable body includes: a body configured to perform autonomous driving; a storage box attached to the body and configured to temporarily store a package; and a controller configured to move the body from a first location to a second location. The movable body waits at the first location demarcated at an entrance of a multi-family residence. When the package is placed into the storage box, the controller moves the body to the second location in the multi-family residence. When the package is taken out of the storage box at the second location, the controller moves the body back to the first location.

Movable bodies such as ultra-compact mobility vehicles are able to travel along a corridor and ride in an elevator by autonomous driving. The above aspects will reduce the burdens on a recipient, because the movable body receives a package at the entrance of a multi-family residence and travels to each individual apartment by autonomous driving. Since the movable body meets a delivery person, the delivery person does not need to visit each individual apartment. If the number of delivery lockers is increased, the installation space for the delivery lockers also increases. According to the above aspects, the movable body can be moved as required, so that the movable body does not occupy the installation space at all times.

In the above aspect, the storage box may be configured to be lockable by the delivery person and unlockable by the recipient.

With this configuration, it is possible to prevent a theft of the package that has been placed in the storage box. The movable body can be kept waiting with security even when it will take some time before the recipient comes home.

The present disclosure provides a movable body configured to reduce the burdens on a recipient and a delivery person, and also provides a method of using the movable body.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
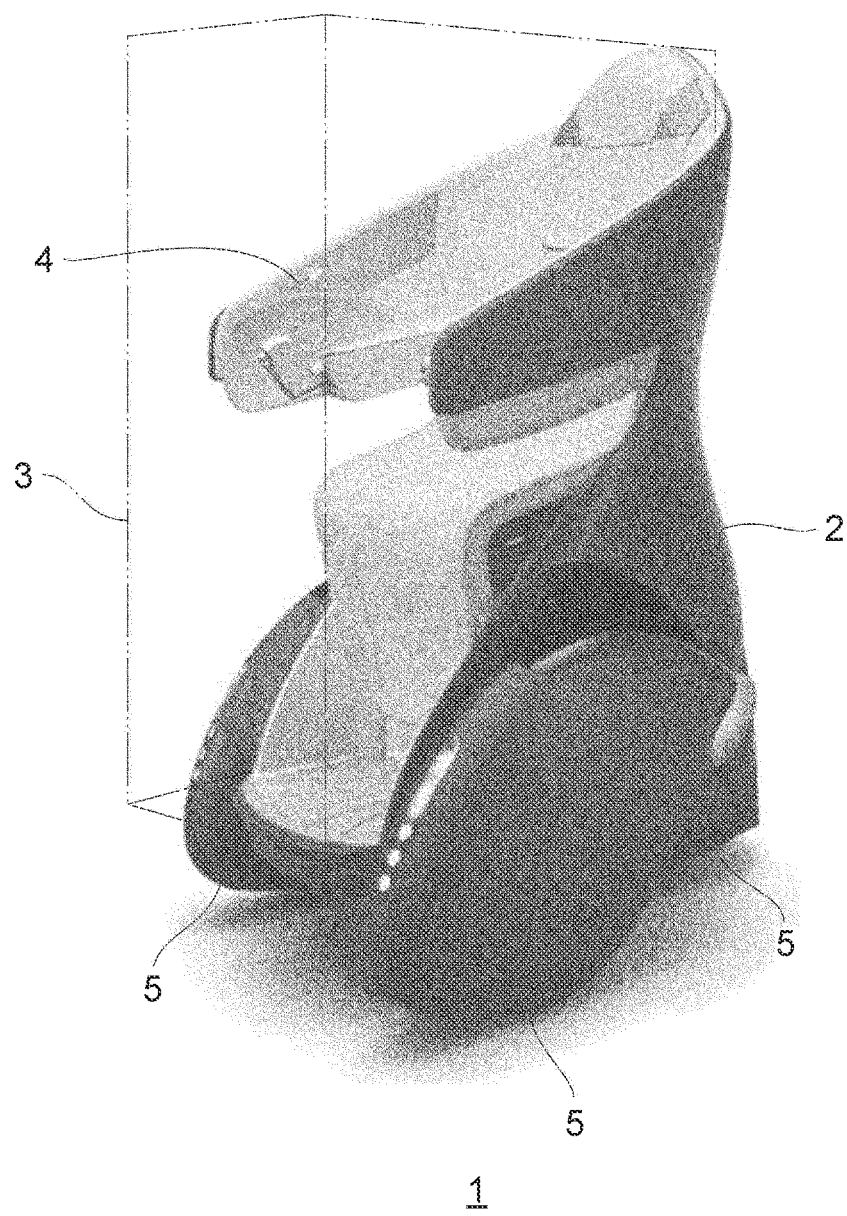
FIG. 1 is a perspective view illustrating a movable body according to an embodiment of the present disclosure.
Figure 2:
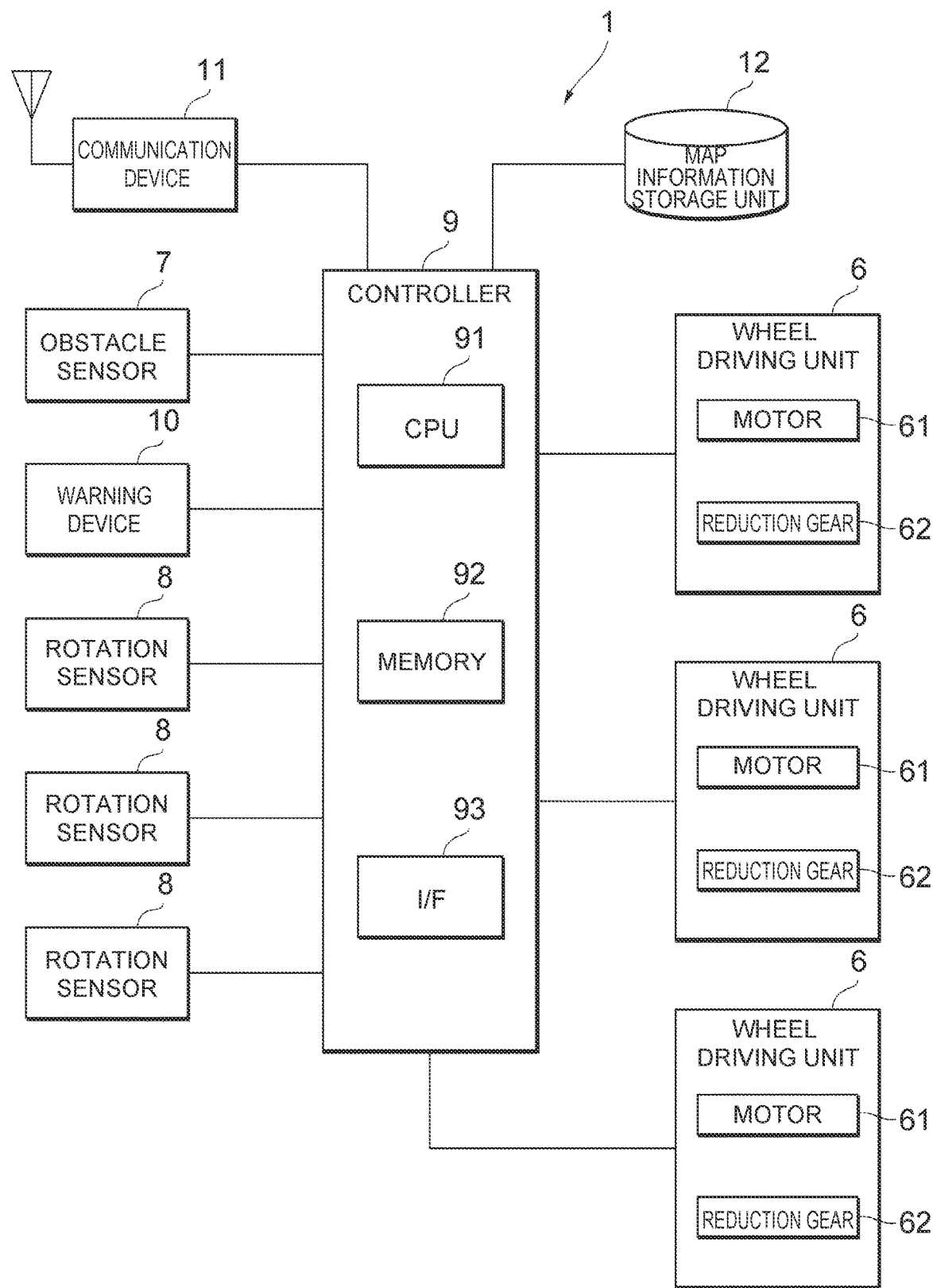
FIG. 2 is a diagram illustrating an example of a configuration of a system of the movable body illustrated in FIG. 1.
Figure 3:
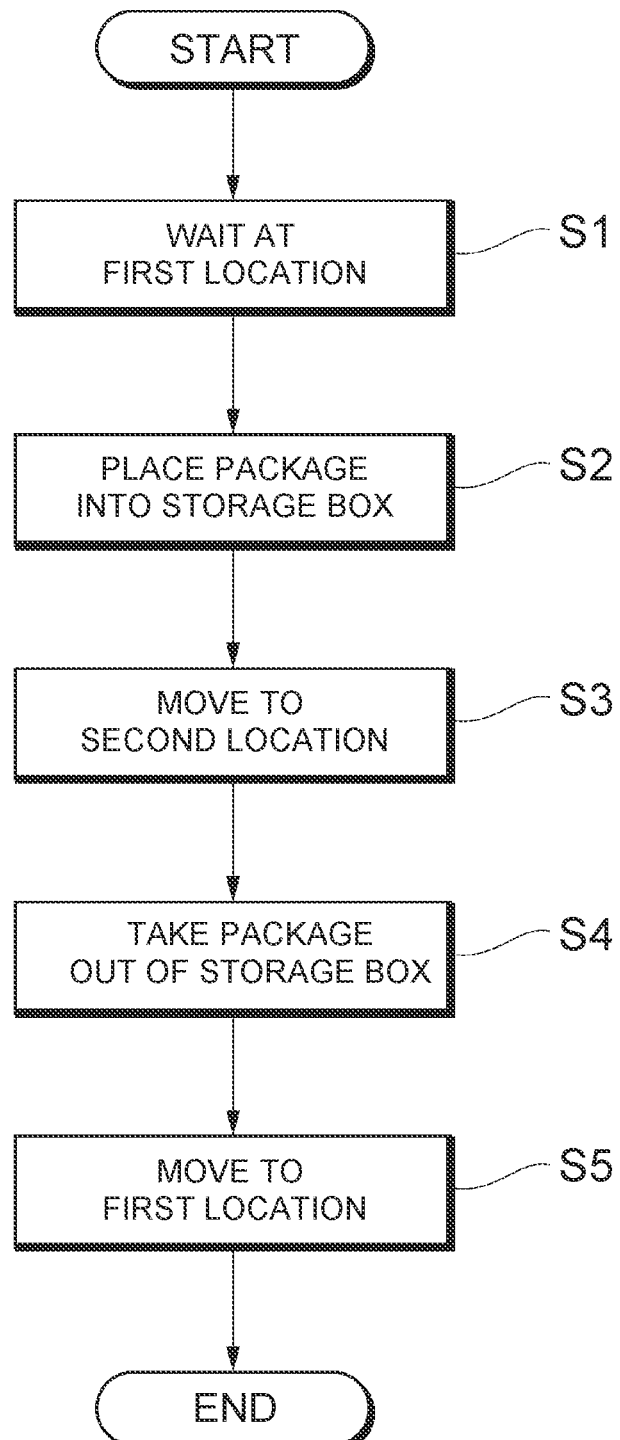
FIG. 3 is a flowchart illustrating an example of a method of assisting delivery of a package with the use of the movable body illustrated in FIG. 1.

Hereinafter, an example embodiment of the present disclosure will be described with reference to the accompanying drawings. Note that elements denoted by the same reference signs in the drawings have the same or similar configurations. A movable body 1 according to an embodiment of the present disclosure is a self-propelled delivery locker implemented as an ultra-compact mobility vehicle equipped with a delivery box. The movable body 1 is able to travel along a corridor and ride in an elevator by autonomous driving. The movable body 1 is able to receive a package from a delivery person at a first location (e.g., an entrance of a multi-family residence) and wait for an access from a recipient at a second location (e.g., the recipient's front door or a waiting space demarcated on each floor). With reference to FIG. 1 to FIG. 3, configurations will be described in detail below.

FIG. 1 is a perspective view illustrating the movable body 1 according to an embodiment of the present disclosure. In an example illustrated in FIG. 1, the movable body 1 includes a body 2, a storage box 3 attached to the body 2, an operation panel 4 configured to receive operations from users, such as a delivery person and a recipient, and drive wheels 5 for moving the body 2. Although dimensions of the movable body 1 are not specifically limited, the movable body 1 is preferably small enough to be able to travel along a corridor of a multi-family residence and ride in an elevator, for example.

The storage box 3 includes a lock mechanism configured to be lockable by a delivery person who has placed a package in it and unlockable by a recipient who is going to take out the package. The lock mechanism is not specifically limited in configuration. For example, the lock mechanism may be configured such that the storage box 3 is locked upon entry of a room number of the recipient into the operation panel 4 and the storage box 3 is unlocked upon entry of a passcode associated with the room number into the operation panel 4.

For example, the lock mechanism may be configured such that once a package is placed into the storage box 3, a camera installed inside the storage box 3 reads, for example, a code (e.g., a two-dimensional code containing information, such as the room number and an unlock number) assigned to the package, and the storage box 3 is automatically locked, and the storage box 3 is unlocked when the passcode or password associated with the code is entered. For example, the lock mechanism may be configured such that the storage box 3 is unlocked when an unlock key, such as an RF tag, associated with the recipient is held around the lock mechanism. For example, the lock mechanism may be configured such that the storage box 3 is unlocked through biometric authentication based on, for example, fingerprint, iris, or vein.

The operation panel 4 is an interface used by the user of the movable body 1 to enter information. The operation panel 4 has operation buttons and/or a touch panel for the user to perform input operations. Upon an operation performed by the user, the operation panel 4 supplies a signal corresponding to the operation to a controller 9 built in the body 2.

The drive wheels 5 are composed of a total of three wheels, that is, two wheels provided at the front side and one wheel provided at the rear side. The movable body 1 has a function of adjusting its wheel base by moving the drive wheel 5 provided at the rear side closer to or away from the drive wheels 5 provided at the front side. Thus, the space occupied by the movable body 1 can be reduced by decreasing the wheel base when the movable body 1 is in a waiting state or when the movable body 1 is in a narrow space, such as in an elevator. When the movable body 1 carries a heavy package, the center of gravity of the movable body 1 can lowered by increasing the wheel base.

FIG. 2 is a diagram illustrating an example of a configuration of a system of the movable body 1 illustrated in FIG. 1. The movable body 1 includes wheel driving units 6 configured to respectively drive the drive wheels 5, an obstacle sensor 7 configured to detect the presence or absence of an obstacle, rotation sensors 8 configured to respectively detect rotation information of the drive wheels 5, and the controller 9 configured to control the wheel driving units 6.

The wheel driving units 6 are built in the body 2, and drive the corresponding drive wheels 5. Each drive wheel 5 is driven to be rotated by the corresponding wheel driving unit 6 independently from the other drive wheels 5. Each wheel driving unit 6 includes, for example, a motor 61, and a reduction gear 62 coupled to a rotation shaft of the motor 61 so as to allow transmission of power.

The obstacle sensor 7 is provided on the body 2, and is configured to detect the presence or absence of an obstacle or approach of a pedestrian and the output the detected information to the controller 9. The rotation sensors 8 are respectively provided on the drive wheels 5. Each rotation sensor 8 is configured to detect rotation information of the corresponding drive wheel 5, such as a rotation angle, a rotation angular velocity, and a rotation angular acceleration. Each rotation sensor 8 is, for example, a rotary encoder or a resolver, and is configured to output the detected rotation information to the controller 9.

The controller 9 generates control signals for controlling driving of the wheel driving units 6 based on detected values output from the various sensors mounted on the movable body 1, and then outputs the control signals. The controller 9 executes predefined computation processing based on, for example, the information regarding the presence or absence of an obstacle output from the obstacle sensor 7, and the rotation information of the drive wheels 5 output from the rotation sensors 8, and then outputs necessary control signals to the wheel driving units 6.

Hardware components of the controller 9 mainly include, for example, a central processing unit (CPU) 91 configured to perform control processing and computation processing, a memory 92 including a read-only memory (ROM) in which control programs, computation programs and the like to be executed by the CPU 91 are stored, and random-access memory (RAM), and an interface (I/F) 93 through which signals are received from and sent to the outside.

The CPU 91, the memory 92, the interface 93 and so forth are interconnected via, for example, a data bus. The programs to be executed by the CPU 91 may be provided in a state where the programs are stored in a computer-readable storage medium. The storage medium a non-transitory tangible medium that is able to store programs. The programs include, for example, software programs and computer programs.

In the example illustrated in FIG. 2, the movable body 1 further includes a warning device 10, a communication device 11, and a map information storage unit 12. The warning device 10 issues a warning in response to a signal from the controller 9 such that a pedestrian is prevented from colliding with the movable body 1. The warning device 10 is not specifically limited in configuration. The warning device 10 may be a speaker configured to output sound or a lighting device configured to illuminate or flash a warning lamp.

The communication device 11 is, for example, a communication circuit configured to perform communications, under predetermined communication standards, with an external server device or GPS satellites. The communication device 11 includes, for example, a transmission circuit that transmits radio waves via an antenna, a reception circuit that receives radio waves via the antenna, and a switching circuit that switches the circuit to be connected to the antenna between the transmission circuit and reception circuit.

The communication device 11 may obtain position information of the movable body 1 from GPS satellites or obtain the position information of the movable body 1 from a plurality of sensors, wireless devices, security cameras and so forth installed in a premise of a multi-family residence, for example. The map information storage unit 12 stores map information regarding a map from the entrance of the multi-family residence to each apartment.

FIG. 3 is a flowchart illustrating an example of a method of assisting delivery of a package with the use of the movable body 1 illustrated in FIG. 1. As illustrated in FIG. 3, the movable body 1 is waiting at, for example, the first location demarcated at an entrance of a multi-family residence (S1). The movable body 1 includes the storage box 3 configured to be lockable by a delivery person who has placed a package in it and unlockable by a recipient who is going to take out the package.

The delivery person cuts off a slip (invoice), places a package into the storage box 3, and enters the recipient's room number indicated on the slip into the operation panel 4, for example. The delivery person does not need to visit each individual apartment. A manner in which the movable body 1 obtains information on the recipient is not specifically limited. As described above, the information on the recipient may be automatically entered by a built-in camera for reading a slip or may be obtained from a communication network by the communication device 11. Once the information, such as the room number, is entered, the controller 9 locks the storage box 3.

After the package is placed into the storage box 3 (S2), the controller 9 moves the body 2 to the second location in the multi-family residence (S3). The second location is the recipient's front door or a waiting space demarcated on each floor. As described above, the controller 9 built in the body 2 generates control signals for controlling driving of the wheel driving units 6 based on detected values output from the various sensors mounted on the movable body 1, and then outputs the control signals.

The movable body 1 receives a package from the delivery person and moves to an individual apartment by autonomous driving. The controller 9 executes predefined computation processing based on, for example, the information regarding the presence or absence of an obstacle output from the obstacle sensor 7, and the rotation information of the drive wheels 5 output from the rotation sensors 8, and then outputs necessary control signals to the wheel driving units 6, thereby moving the body 2 to the second location. After moving to the second location, the movable body 1 is waiting at the second location until the movable body 1 is accessed by the recipient.

The movable body 1 may check whether the recipient is at home or away from home when moving to the second location after the storage box 3 is locked. For example, if the recipient is away from home for a long period due to hospitalization or studying abroad, a message indicating that the package will be handed to, for example, a janitor of the multi-family residence instead of to the movable body 1 may be displayed, for example, on the operation panel 4. For example, the movable body 1 may be configured to automatically go back to the first location if there is no access from the recipient after waiting until a predetermined time.

When the package is taken out of the storage box 3 at the second location (S4), the controller 9 moves the body 2 back to the first location (S5). A passcode or a password, or an unlock key, such as an RF tag, may be used by the recipient to unlock the storage box 3 and take out the package. The movable body 1 includes the communication device 11 configured to communicate with an external server device. There may be employed a configuration that allows the delivery person to check whether the recipient has received the package using the server device.

The movable body 1 according to the present embodiment thus configured and the method of assisting delivery of a package with the use of the movable body 1 will reduce the burdens on the recipient as compared to a case where a delivery locker is used while the recipient is away from home, because the movable body 1 receives a package at the entrance of a multi-family residence and travels to each individual apartment by autonomous driving. Since the movable body 1 meets the delivery person, the delivery person does not need to visit each individual apartment. This reduces the burdens on the delivery person.

If the number of delivery lockers at the entrance of a multi-family residence is increased, the installation space for the delivery lockers also increases. According to the foregoing embodiment, the movable body 1 can be moved as required, so that the movable body 1 does not occupy the installation space at all times. The storage box 3 attached to the movable body 1 is configured to be lockable by the delivery person and unlockable by the recipient. This can prevent a theft of the package that has been placed in the storage box 3. The movable body 1 can be kept waiting with security even when it will take some time before the recipient comes home.

The embodiment described above is provided to facilitate the understanding of the present disclosure and is not intended to limit the interpretation of the present disclosure. The elements included in the embodiment and their arrangement, materials, conditions, shapes, sizes and so forth are not limited to those illustrated herein but may be modified as appropriate. Moreover, elements that are illustrated in different embodiments may be partially interchanged or combined.

For example, in order to protect privacy of residents of a multi-family residence, a slip may be encrypted such that information, such as the recipient's room number and name (sex), are not visible. The entrance of the multi-family residence is designated instead of the recipient, and the delivery person delivers a package to the entrance. The movable body 1 reads the RF tag or two-dimensional code assigned by a sender to the package to interpret the information on the recipient, and moves to the second location associated with the package.

What is claimed is:

1. A method of using a movable body, the method being a method of assisting delivery using the movable body comprising: a body configured to perform autonomous driving; a storage box attached to the body, the storage box being configured to temporarily store a package; and a controller configured to move the body from a first location to a second location, wherein
   the movable body waits at the first location demarcated at an entrance of a multi-family residence,
   when the package is placed into the storage box, the controller moves the body to the second location in the multi-family residence, and
   when the package is taken out of the storage box at the second location, the controller moves the body back to the first location.

* * * * *